Figures 1, 2:
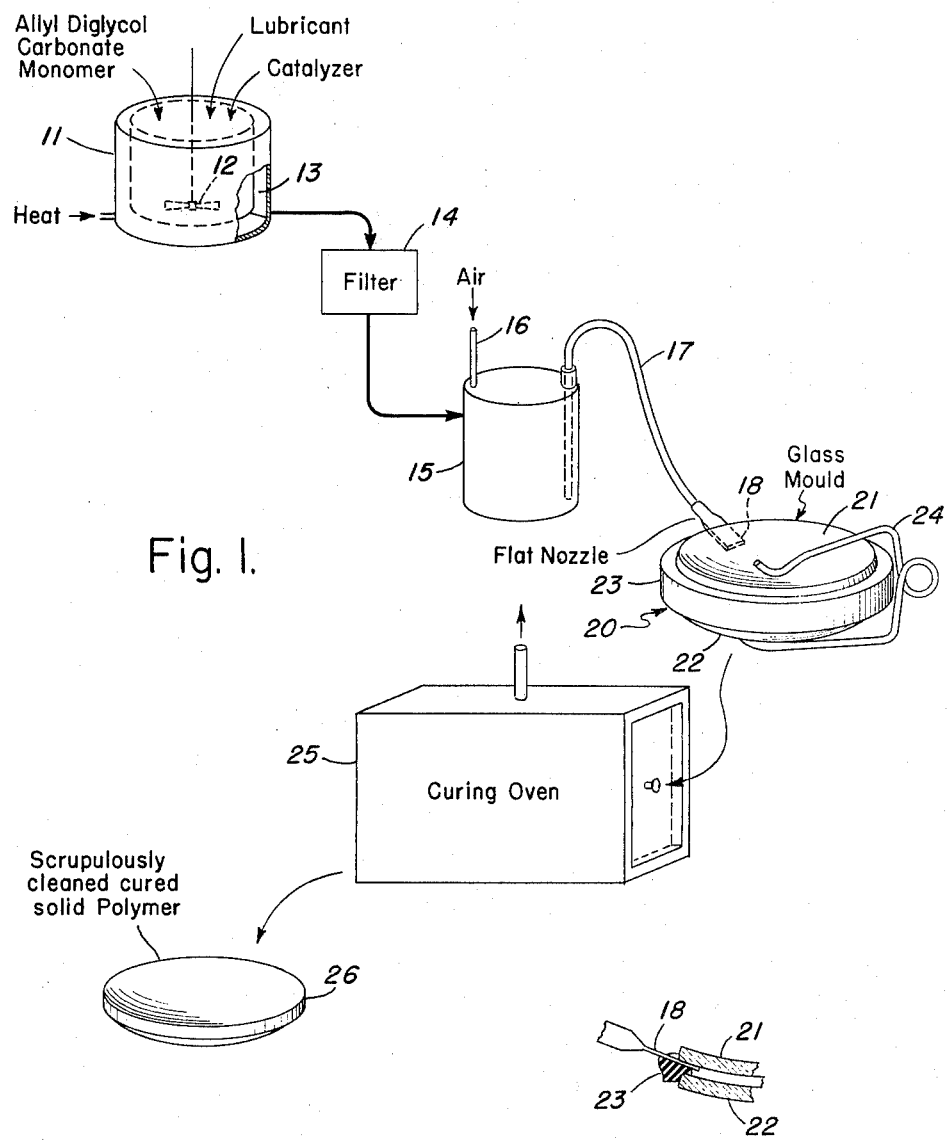

Feb. 20, 1951     J. O. BEATTIE     2,542,386
MANUFACTURE OF PLASTIC LENSES FROM MONOMERIC MATERIALS
Filed Dec. 3, 1947     2 Sheets-Sheet 1

INVENTOR.
John O. Beattie
BY
Arthur Middleton
ATTORNEY

Feb. 20, 1951        J. O. BEATTIE        2,542,386
MANUFACTURE OF PLASTIC LENSES FROM MONOMERIC MATERIALS
Filed Dec. 3, 1947        2 Sheets-Sheet 2

INVENTOR.
John O. Beattie
BY
Arthur Middleton
ATTORNEY

Patented Feb. 20, 1951

2,542,386

UNITED STATES PATENT OFFICE 2,542,386

MANUFACTURE OF PLASTIC LENSES FROM MONOMERIC MATERIALS

John O. Beattie, New York, N. Y.

Application December 3, 1947, Serial No. 789,418

1 Claim. (Cl. 18—58)

This invention relates to the production of lenses from a cross-linkable resin monomer that is polymerized and solidified by heat curing while in its mold. One form of such lenses is useful in eye-glasses of the ophthalmic type, which lenses may be curved or rounded in shape. More particularly, the invention relates to the production of such lenses without the use of pressure or of pressure molding and yet yields lenses that are crystal clear without vision-obstructing or distorting properties. The invention is directed to the use of a resin monomer of the general type and characteristics of allyl di-glycol carbonate, namely, di-ethylene glycol bis (allyl carbonate), which when cured forms a cross-linked polymer. Such characteristics include importantly that the polymer is insoluble in its monomer; that the vapor pressure of the monomer below its boiling point is relatively low; that the monomer during curing becomes increasingly viscous and then gels under conditions under which the gelatin occurs uniformly throughout the resinous mass followed by progressive hardening; and that the cured polymer has high resistance to discoloration, to warping or distortion, to impact, and to abrasion.

One feature of the invention is to add to the monomer some lubricating agent or reagent which while not affecting the uniformity of the refractive index or other optically desirable qualities or the appearance of the plastic, does minimize if not completely avoid the sticking of the plastic to its mold during the curing phase so that the polymerized and cured plastic is readily and cleanly removable from its mold.

This type of monomer yields a cross-linked polymer and shrinks significantly when passing through the curing phase into a solidified polymer, so it is another object of this invention to devise a gasket material or substance to place around the edges of and between the inner faces of the mold elements that, while preventing the monomer from escaping from the mold while liquid, will deform resiliently enough and compress to allow the sides of the mold to be pulled or sucked together an amount equal to the degree or extent of contraction or shrinkage of the monomer in passing to the solidified polymer phase. Another object is to devise or select a gasket material of such a nature that after being once used, it can be reclaimed, retreated or reformed, and used over again.

Other objects and features of advantage will appear as this specification proceeds. The best embodiment of the invention now known to me has been selected, but it is to be understood that it is shown for illustrative purposes only and not for purpose of limitation, because obviously the invention is capable of modifications of steps, arrangement and details of construction without departing from the ambit of the appended claim, although there should be recalled that in interpreting the claim, the principle of reversal of parts should be borne in mind.

Figure 3:
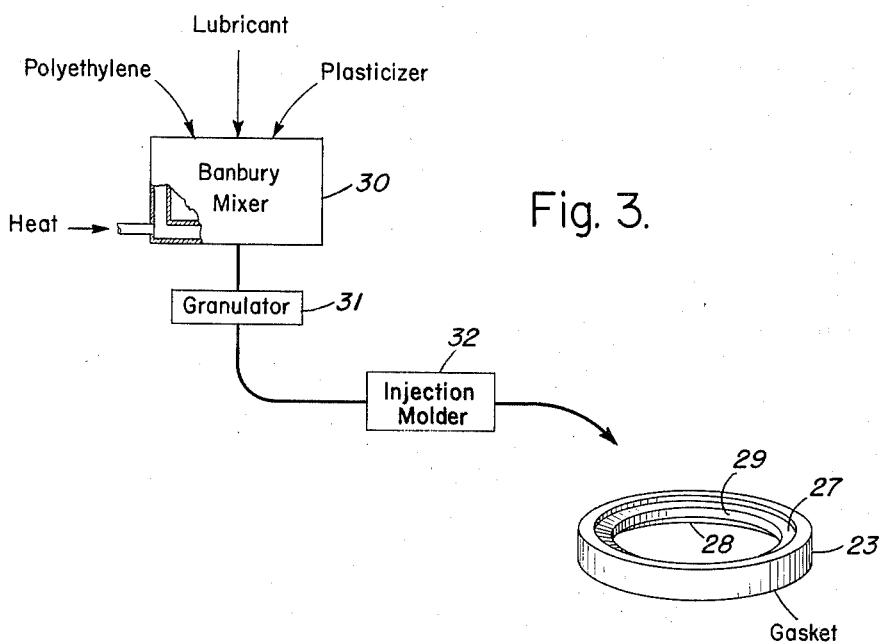
Figure 4:
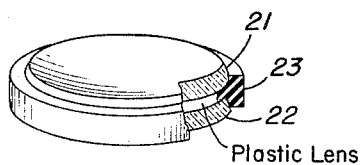
Figure 5:
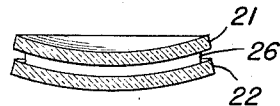
Figure 6:
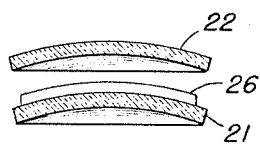
Figure 7:
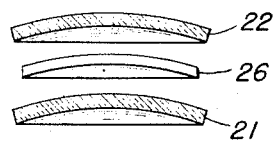

In the accompanying drawings, Fig. 1 is a diagrammatical flow-sheet with apparatus shown symbolically in it, illustrating the steps and stations used in the practice of this invention. Fig. 2 shows a detail of how the monomer is put into the mold. Fig. 3 is a showing of the making of the gasket as well as the making of the compound from which it is formed. Fig. 4 is a view with parts cut away taken through the mold and its cast polymer. Fig. 5 shows a vertical sectional view of the glass molding elements and the polymer therebetween with the gasket removed. Fig. 6 shows the concaved face mold removed, while Fig. 7 shows the lens detached from both molds.

In the drawings, 11 indicates a container having an agitating or mixing impeller 12. The container or mixer has double walls to provide a space 13 therebetween to which some heating medium can be supplied for heating the materials being mixed in the mixer. To this mixer is supplied the monomer of the type of allyl diglycol carbonate; a catalyzer for it such as benzoyl peroxide, acetyl peroxide, or isopropyl percarbonate; and the lubricant, such as Ortholeum 162 which is chemically a mixture of mono and dialkyl phosphates. It is used in industrial oils and gear lubricants to reduce wear and impart antirust properties. Excessive heat will cause slow decomposition and its use is confined to applications where high temperatures are not encountered. After proper mixing, the mix is filtered as at 14 and then put in a tank 15 that is provided with an air-pressure attachment 16 for forcing the mix out from the tank through flexible piping or hose 17 that terminates in a flattened nozzle 18. In the mixing, heat is used in the case of benzoyl peroxide for it speeds up dissolution. It is not necessary to heat if isopropyl percarbonate or acetyl peroxide are used.

The mold is shown at 20 and is comprised of two discs of glass 21 and 22 having carefully shaped ground and polished adjacent faces (that must be scrupulously clean of dust and lint) with which the monomer contacts so the monomer may be said to be supplied to a glass-sided molding cavity. These discs of glass are spaced apart entirely around their edges or periphery by a resilient annular gasket 23 and the discs are clamped together tightly by spring-bearing clamp 24. Monomer from tank 15 is air-pumped through hose 17 and nozzle 18 through an opening made by lifting a portion of the gasket from contact with one of the discs to fill the space or molding cavity between the glass discs 21 and 22, meanwhile letting air escape from between the glass discs through that space around the nozzle, until the molding cavity has been completely filled with the monomer, whereupon the opening is closed quickly by allowing the resilient gasket to resume its disc contacting and sealing position. The mold 20 is then ready for insertion into the curing oven 25. The nozzle insertion is illustrated in Fig. 2.

Suitable curing and polymerization of the monomer into the desired cross-linked polymer product is effectuated within the glass mold 20 while located and retained within the oven 25. When this oven-curing operation is completed, the mold is removed; the spring clamp 24 taken off; the gasket 23 is peeled off of the discs as shown in Fig. 4; one glass plate 22 removed from the plastic lens 26; and then the plastic lens removed from the other glass disc 21, which can be done readily because the glass discs are greater in diameter than the lens. After cleaning, the lens 26 is ready for marketing.

As to the gasket material, it is made as indicated in Fig. 3. Polyethylene, a plasticizer such as polyisobutylene mol. wt. 100,000 and a lubricant such as lead stearate, are put into a mixer or rubber-mill 30 suitably heated so that these ingredients are fused and well mixed, whereupon the plastic mix is passed to a granulator 31 and then through an injection mold 32, from which issue the annular gasket rings 23, which are used to provide a marginal gasket for defining the edge portion of the ultimate cured and polymerized product. After being used once, a gasket can be cut up and treated in the Banbury mixer 30 with its subsequent reformation into a usable gasket again, because it is thermoplastic and not thermosetting. However, because of decomposition and contamination it is not possible to reclaim gaskets more than two or three times.

The material or compound chosen for the gaskets is very important and must be correlated with certain characteristics of the monomer herein proposed for use in making the plastic sheets. When the proposed monomer is polymerized, it shrinks approximately 14% volumetrically, so in order to assure smooth sides or faces on the cast plastic lens, the faces of the mold (glass discs 21 and 22) must be pulled or sucked together a corresponding amount and at the same rate as the shrinkage of the monomer takes place in passing into the polymerized phase. This sucking or pulling together of the glass discs by shrinking of the curing monomer must be permitted by the character of the gasket material. That is, the gasket must be deformable but at the same time sufficiently resilient to maintain a tight seal between the glass discs during the slight initial expansion of the monomer followed by the subsequent shrinkage thereof. The gasket material also must be inert and non-contaminating to the monomer so that the edges of the monomer or product resulting therefrom, are not spoiled or degraded. To that end, it is proposed to form the gasket of a mixture of polyethylene and a plasticizer exemplified by polyisobutylene that is softer than the polyethylene as well as a lubricant exemplified by lead stearate. The polyethylene and the polyisobutylene are used satisfactorily in equal parts and the lead stearate or lubricant is used in an amount of about one-half percent of the total mix. The mixture is mixed in the Banbury mixer or rubber-mill 30 while heated to become kneadable and of the consistency substantially of chewed chewing gum. Thereafter, when the required softening and thorough or intimate mixing of the ingredients have been attained, it is fed to and granulated in the granulator 31 after which the granulated material is passed into a molder 32, wherein the heated material is forced into a mold of the desired shape, from which the gaskets are formed. These rings are die-shaped to provide specially shaped faces which facilitate and allow for the necessary deformation as the lens molding process proceeds.

To prevent the mold from leaking, the edges or peripheries of the glass discs between which the monomer is cast must fit into accurately formed complementary faces or grooves in the bore section of the gasket 23, as shown in Figs. 3 and 4. For instance the groove 27 is shaped to be complementary with the peripheral edge of the disc 21 whose convex face is used in casting the monomer while the groove 28 is complementary with the peripheral edge of the disc 22 whose concave face is used in casting the monomer. 29 represents a lip or flange on the inner periphery of the gasket ring 23 that spaces apart the discs 21 and 22 a distance that controls the thickness of the cast lens. A particular feature of these gaskets is the inside lip, which is molded at such an angle as to rest flat on both glass dies. See broken away sections in Fig. 4, which are shaped to be complementary to the edges of the parts 21, 22 and 26 in Fig. 5.

As to the monomer mix, it is desirable (but not essential) that the mix be provided with a lubricant to permit the ready separation of the polymerized lens from the glass sides of the mold without tearing or having some of the polymer stick to the glass and thus be pulled away from the polymerized lens. This lubricant must not cause separation of parts of the monomer or of the polymer and it must not affect the optical qualities of the polymer. The lubricant is used to permit the separation of the polymer at any predetermined degree of strain when applied between the polymer and the glass but which strain is greater than the power of the monomer to pull or suck the glass plates 21 and 22 toward each other during shrinking of the monomer in the curing operation. It has been found that highly satisfactory results are obtained by the use of Ortholeum 162, but the quantity used is very important. It should be used in quantity lying in a range of from substantially 25/10,000 to substantially 50/10,000 of one percent by weight of the monomer mix. Lesser quantities do not lubricate adequately while greater quantities may cause separation during the curing cycle. The exact proportion within the limits given is best found by trial. Such a lubricant is an oily liquid and has the property of penetrating homogeneously the entire mix. Another ingredient of the monomer mix is a catalyzer such as benzoyl peroxide or isopropyl percarbonate in an amount approximately 3% by weight of the monomer mix. If benzoyl peroxide is used the liquid mixture is heated to approximately 55° C. and stirred to get a good mix. Then it is filtered, preferably twice, to assure its freedom from contaminating solids and particularly lint, whereupon it is ready to be forcibly flowed into the mold as shown in Fig. 1. A surface-active agent, such as Aerosol and the like, may also be used as a lubricant as long as it causes variation in interfacial tension resulting in diminution of boundary adhesion between the dissimilar materials—glass and the resin. The lubricant is preferably added after filtration of the monomer otherwise it tends to adhere to the filter pads and be "filtered" out. The gasket material thus proposed is flexible, moldable and inert to the resin monomer while the latter is being cured and cast.

The mold, with its monomer content, is placed in the curing oven 25 where the curing and resulting polymerization (or solidification) takes place. The oven must be heated uniformly and homogeneously since a few degrees localized difference in temperature is detrimental to the final product. Therefore, a heating medium and a fan or fans are provided for the oven to assure uniform temperature therein as well as to exhaust exothermically generated heat resulting from the polymerization reaction. The cure should start at a temperature from say between 50° C. and 70° C. but not substantially above 80° C. and then be slowly raised to substantially 115° C. If the mold is held at constant temperature, gelation takes place uniformly throughout the monomer. Gel is yielded in about 2 hours at 70° C. with benzoyl peroxide catalyst 3% in allyl di-glycol carbonate. The temperature used determines the duration of the curing treatment. If 80° C. is not significantly exceeded, the cure may be completed within, say, 12 hours. Greater variation in curing temperature is permissible as the cure approaches its limit. Over-curing gives a polymer that is brittle and yellow.

After curing, the solid-phase plastic lens is removed from the mold, as shown in Figs. 6 and 7, by first prying loose the concave faced glass molding plate 22, leaving the polymer lens still adhering to the convex faced glass mold 21 and thereafter the lens is easily removed from the latter. The lens is clean when it comes out of the mold.

The resin monomer proposed and preferred for use in this process is a clear, colorless, water-insoluble, organic liquid of low viscosity containing only carbon, hydrogen and oxygen. During curing (with its admixtures) it passes through a syrupy stage after which it gradually increases in viscosity and then forms a gel. The gel hardens and finally becomes a strong, hard, insoluble, infusible, clear, and substantially colorless solid. Other cross-linkable resin monomers that can be used include di-allyl phenylphosphonate, di-allyl phthalate, ethylene di-methacrylate and methacrylic anhydride. In selecting the monomer, one must be used whose polymer is insoluble in its monomer and one that becomes viscous and then gels uniformly, which gel gradually hardens. Where gelation takes place from the center of the monomer mass outwardly, the outer regions of the mass remain liquid wherein shrinkage takes place with the result that air is sucked in through the gasket with the result that the cast polymer is spoiled.

In the case of a high vapor pressure monomer, bubbles are formed due to evaporation. Whereas, the use of a cross-linkable resinous monomer has been described, it is possible to co-polymerize by the use of a mixture of such a monomer with a linear linkable monomer. The resulting polymer will be a compromise because the linear linked constituent has diluting characteristics of the desired characteristics of the cross-linked constituent. Nevertheless, it may be desirable to use such mixed monomers as starting material for curing to produce certain cast polymers for use as—

Ophthalmic lenses
Camera finder lenses
Reading lenses
Scale lenses
Reflector lenses
Binocular lenses
Objective lenses
Eyepiece lenses
Condenser lenses
Schmidt lenses
Corrective lenses
Flat sheets
Simple curved sheets
Compound curved sheets

I claim:

The process of making optically uniform polymerized products and particularly curved articles such as lenses, which comprises mixing together a resin monomer capable of yielding upon heating a cross-linked polymer, a catalyzer therefor, and a lubricant; supplying such mixture to a cavity in a molding container whose sides are maintained in variably spaced apart relationship by a resilient thermo-plastic gasket whose material is flexible as well as moldable, curing the mixture, and removing the cured hardened lens from the container; characterized in that the mixture is supplied to the cavity in the container by forcing the mixture through a flattened nozzle inserted between a section of the gasket and an adjacent side of the container meanwhile letting air escape from the cavity around the nozzle, and then when the cavity is full removing the nozzle whereupon the gasket resumes sealing position.

JOHN O. BEATTIE.

REFERENCES CITED

The following references are of record in the file of this patent:

UNITED STATES PATENTS

| Number | Name | Date |
|---|---|---|
| 2,241,415 | Moulton | May 13, 1941 |
| 2,272,847 | Macht | Feb. 10, 1942 |
| 2,314,838 | Kingston | Mar. 23, 1943 |
| 2,319,014 | Smith | May 11, 1943 |
| 2,333,051 | Smith | Oct. 26, 1943 |
| 2,370,562 | Meunier | Feb. 27, 1945 |
| 2,379,218 | Dial et al. | June 26, 1945 |
| 2,390,129 | Shobert | Dec. 4, 1945 |
| 2,406,361 | Fairbank et al. | Oct. 27, 1946 |
| 2,426,402 | Magrane et al. | Oct. 26, 1947 |